United States Patent [19]
Lin

[11] Patent Number: 5,634,654
[45] Date of Patent: Jun. 3, 1997

[54] REINFORCED JOINT STRUCTURE OF THE BRACES ON A BABY STROLLER

[76] Inventor: Kao-Hsien Lin, 1F, No.21, Lane 55, Her-Jiang St., Taipei, Taiwan

[21] Appl. No.: 478,038

[22] Filed: Jun. 7, 1995

[51] Int. Cl.[6] ................................................ B62B 7/06
[52] U.S. Cl. .................. 280/649; 280/642; 280/47.38
[58] Field of Search ................................ 280/638, 639, 280/642, 643, 647, 648, 649, 650, 655, 657, 658, 38, 39, 47.18, 47.25, 47.38, 47.39; 403/321, 322, 324

[56] References Cited

U.S. PATENT DOCUMENTS

| 649,444 | 5/1900 | Good | 403/322 |
|---|---|---|---|
| 2,633,363 | 3/1953 | Marshall | 280/47.18 |
| 4,126,331 | 11/1978 | Sloan et al. | 280/642 |
| 4,637,626 | 1/1987 | Foss et al. | 280/655 |

FOREIGN PATENT DOCUMENTS

| 2 603 240 | 3/1988 | France | 280/642 |
|---|---|---|---|
| 2 246 227 | 8/1973 | Germany | 280/643 |

Primary Examiner—Richard M. Camby
Assistant Examiner—Frank Vanaman
Attorney, Agent, or Firm—Bacon & Thomas

[57] ABSTRACT

A reinforced structure for the joints of the braces on a baby stroller, and especially an improvement of the first and second joints each constructed by a front brace and the rear brace respectively with a corresponding handle. The first joints have engaging ends of predetermined length, the second joints have grooves for receiving the engaging ends. When the baby stroller is unfolded completely, the engaging ends are engaged in the grooves. Stress on the baby stroller can be transferred to the whole structure of the baby stroller rather than concentrated on the first joints. Useful life of the baby stroller can thus be prolonged. A locking device is provided on the first or second joints.

1 Claim, 8 Drawing Sheets

REINFORCED JOINT STRUCTURE OF THE BRACES ON A BABY STROLLER

BACKGROUND OF THE INVENTION

1. Field of the Invention

The present invention relates to a reinforced structure for the joints of the braces on a baby stroller, and especially to the improvement of first and second joints each formed by a front brace and a rear brace with a corresponding handle. Thus, the stress on the baby stroller can be divided rather than concentrated on the first joints to prevent damage. In this way, reinforcing the baby stroller can be achieved.

2. Description of the Prior Art

For saving space, a conventional baby stroller is designed as a foldable structure which can be portable or storable, accordingly. Besides the cloth made seat, a baby stroller is composed of a plurality of braces and a plurality of joints connecting these braces. As can be seen from FIG. 7 a conventional baby stroller is symmetrical as to a center line between the left and the right parts thereof, and is comprised mainly of two front braces 1', two rear braces 2' and two handles 3', the front braces 1' and the rear braces 2' cross with each other to form an inverted "V" shape, the tops are connected respectively by the first joints 4' and the second joints 5', and are connected to the bottom ends of the handles Y. Each front brace 1' and corresponding rear brace 2' thereof can be moved away from each other about the corresponding first joint 4' or second joint 5' and the handles 3' can be folded over the front braces 1' (as is a well-known technique and is not narrated further herein) to reduce the space they occupy. To prevent the braces and the handles from collapsing when in use, a lockable holding device 6' is provided between the two rear braces 2'. The device 61 is locked when the baby stroller is unfolded to brace between the left and right parts thereof in a symmetrical mode, and is unlocked before the baby stroller is folded. There is no such device provided between the two front braces 1', for such an arrangement can impede folding of the baby stroller. The fact that a baby sits at a position among all the braces, the first joints 4' and the second joints 5' are deviated laterally and inwardly, while the front braces 1' and the rear braces 2' are deviated laterally and outwardly of the stroller. Due to the downward action force of the weight of the baby, the downward action force is exerted at a position closer to the rear of the stroller and will tend to collapse the handles 3' and the corresponding front braces 1' about the first joints 4'(referring to FIG. 8A). As only a minor part of stress can be absorbed by other braces, the joints 4' and 5' will be subjected to plastic deformation under the action of stress and in the long term, the structure of the baby stroller will be damaged. Force induced by deviation of the rear braces 2' can be absorbed by the above mentioned lockable holding device 6'. Since there is no such holding device 6' provided between the two front braces 1', force induced by deviation thereof is conducted directly to the first joints 4'. The rivets in the first joints 4' and other rivets on the front braces 1' are subjected to loosening and dropping. Thus, the joints 4' and 5' should be redesigned.

SUMMARY OF THE INVENTION

The inventor of the present invention has created, a reinforced structure for the joints of the braces of a baby stroller. Particularly, a groove is provided in each second joint, and an engaging end is extended to the top of each first joint and formed integrately with each front brace. Thus when the baby stroller is unfolded, each engaging end and the corresponding groove can be engaged with each other in operation of the first joints and the second joints. The first and the second joints can thus be connected with each other, and when a baby sits in a position between all the braces bilaterally, the forces borne by the front braces can be transferred to the handles and the rear braces via the first joints and the second joints, rather than being concentrated on the first joints to damage them. An object of reinforcing the structure of the joints thus can be achieved. Further, the idea of the present invention is to make an integrated combination of the handles, the front braces and the rear braces connected by the first joints and the second joints, so that a locking device is provided on one side of each first joint or each second joint. The locking device can be locked in a simple way when all the braces are unfoled. This not only creates timer connections of the first joints and the second joints making them capable of bearing most of the downward stress, but also keeps the front braces and the handles locked so as not to be randomly folded.

Accordingly, the main object of the present invention is to provide a reinforced structure for the joints of the braces on a baby stroller. After the first joint and second joint are connected with each other by engagement of an engaging end and a corresponding groove, forces borne by the front braces can be transferred to the handles and the rear braces via the first joints and the second joints, and then transferred to other sub-braces. All the related rivets will not be loosened or removed by virtue of such forces. Thus a goal of safety and long life can be obtained.

The secondary object of the present invention is to provide a reinforced structure for the joints of the braces on a baby stroller, wherein when a baby sits at a position among all the braces bilaterally, the forces borne by the front braces can be transferred to the handles and the rear braces via the first joints and the second joints. No. declination will occur to the front braces, and the rollers at the bottom ends thereof can maintain their horizontal position, thus the useful life of the rollers can be prolonged. The force for pushing the baby stroller can be largely saved, and smooth rolling as well as switching of direction can be achieved.

A further object of the present invention is to provide a reinforced structure for the joints of the braces on a baby stroller, wherein the locking devices added on the first and second joints can lock the front braces, the rear braces and the handles in a simple way, with the connecting portions of the front braces and the handles not subjected to deformation. In addition to strengthening the bearing capability of the first and second joints which are connectable together, the whole engaging strength of the baby stroller can be enhanced against external forces which tend to fold up the stroller. Thus a further strengthening effect can be obtained.

A further object of the present invention is to provide a reinforced structure for the joints of the braces on a baby stroller, wherein locking devices are each formed of a hollow fixing member integrated with each second joint. A laterally movable pressing member is provided on the fixing member, as well as a positioning hole provided on the engaging end or the handle for insertion of the pressing member. Such device can provide a largest effect with the least cost and thus is economical.

The present invention will be apparent in its characteristics and functions of the structure after reading the detailed description of the preferred embodiments thereof in reference to the accompanying drawings.

DETAILED DESCRIPTION OF THE PREFERRED EMBODIMENT

Figure 1:
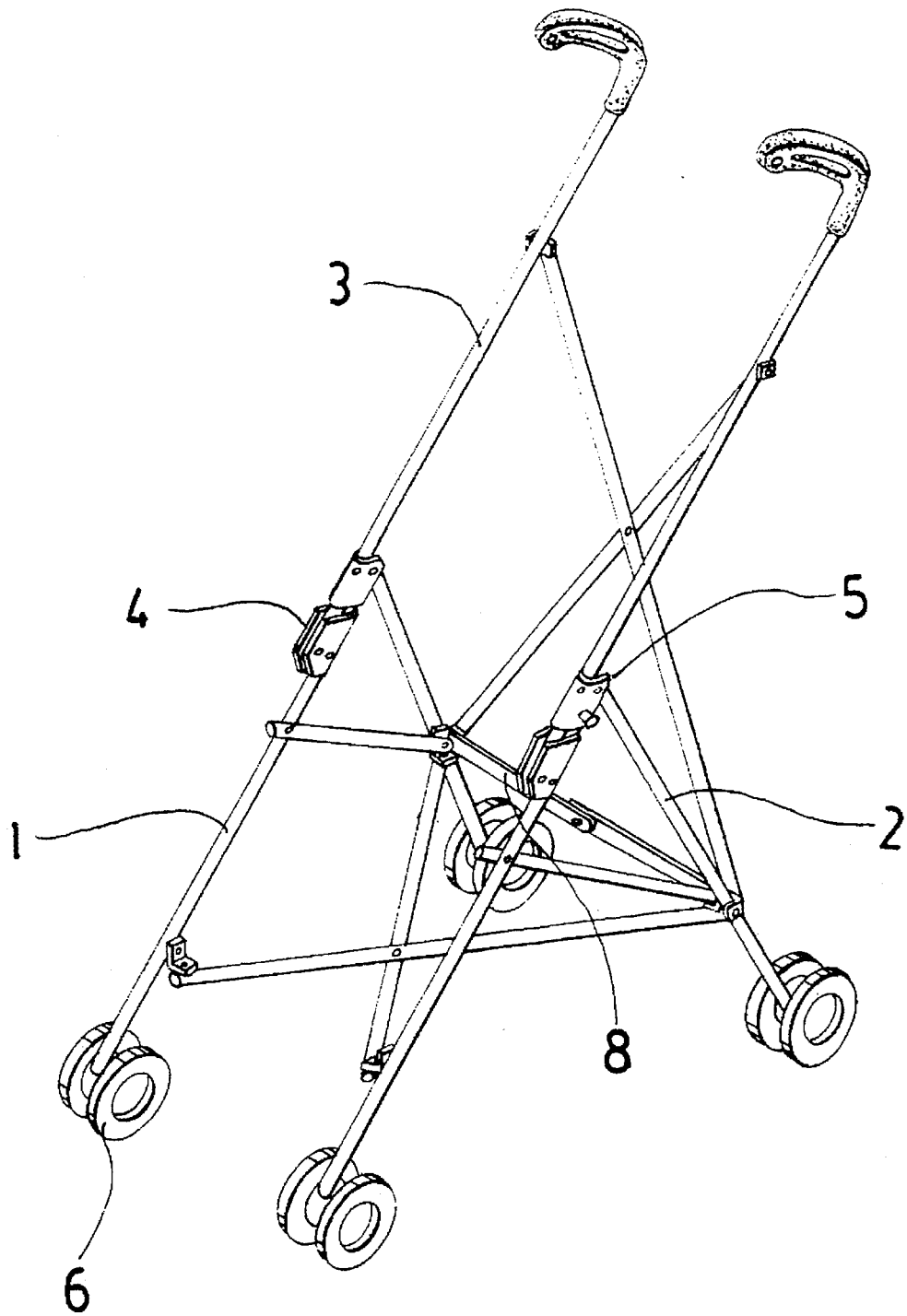
FIG. 1 is a perspective view of the present invention.
Figure 2:
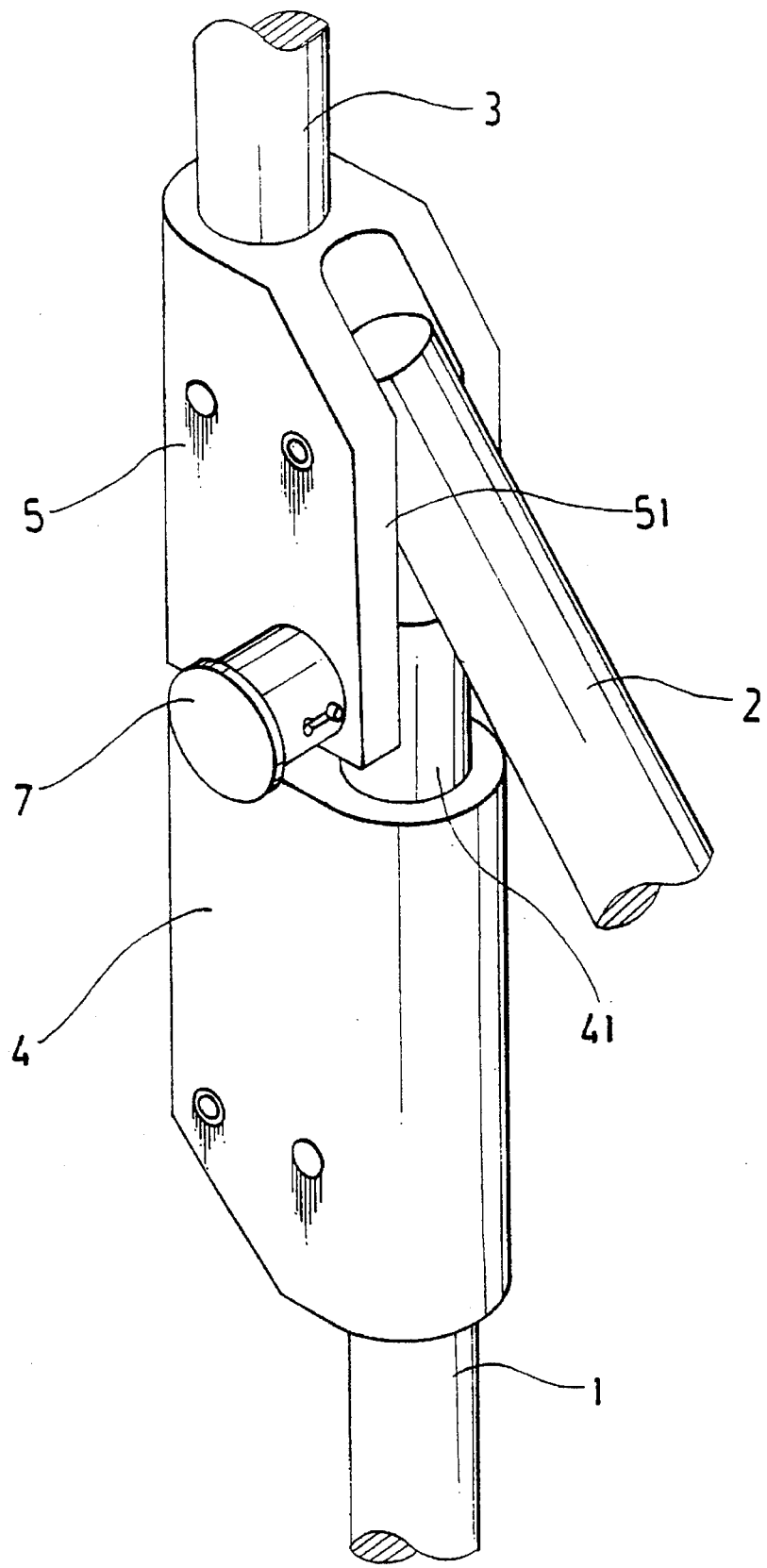
FIG. 2 is a partial enlarged perspective view of the present invention.
Figure 3A:
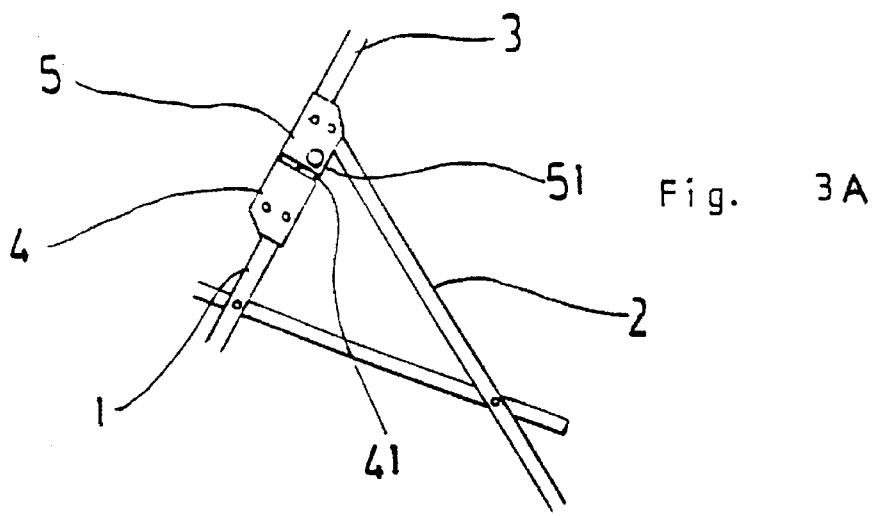
FIG. 3A–3C are schematic views of the present invention when folding.
Figure 3B:
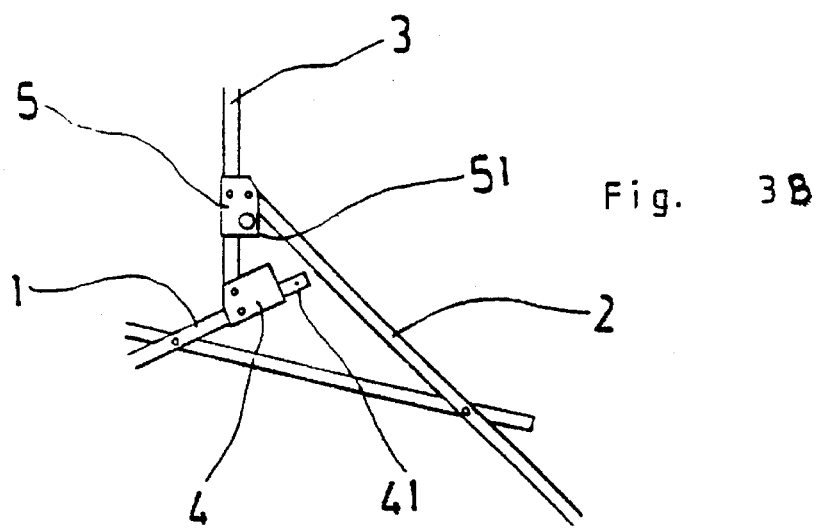
Figure 3C:
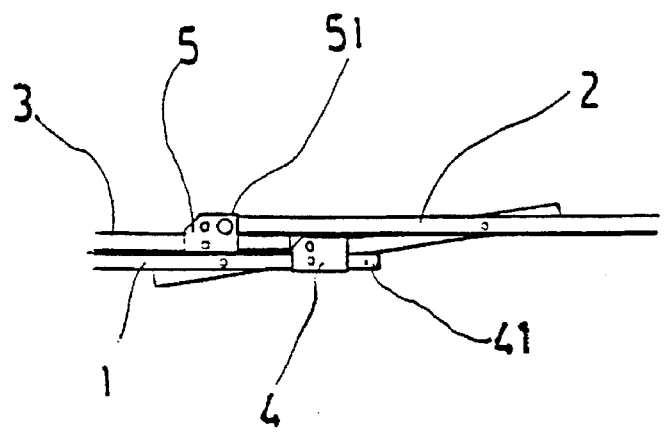

We can see from FIG. 1 that, the reinforced structure for the joints of the braces on a baby stroller includes the redesigned first joints 4 and the second joints 5 of two front braces 1, two rear braces 2 and two handles 3. The front braces 1 and the rear braces 2 are the ones supported on the ground for bearing the weight of the baby stroller, with a pair of rollers 6 are provided for each brace. The handles 3 are for maneuvering the baby stroller. Most of stress when bearing the weight is concentrated on the first joints 4 and the second joints 5 which are the essential members for folding of the baby stroller. The strength of the first joints 4 and the second joints 5 of the present invention must be reinforced without adversely affecting the original function thereof. As shown in FIG. 2, the reinforced joint structure for the braces on the baby stroller of the present invention each provides an engaging end 41 at a rear side of a first joint 4 between the bottom end of each handle 3 and the top end of the corresponding front brace 1, which end 41 extends upwardly from the front brace 1 and directly through the first joint 4 in a predetermined extension. The length of the engaging end 41 should be such that when the baby stroller is folded or unfolded (please also refer to FIG. 3) in pivot the first joint 4 and the corresponding second joint 5, the front and rear braces 1, 2 and the corresponding handle 3, the engaging end 41 will not much the corresponding rear brace 2. A groove 51 is provided in a rear part of the second joint 5 of the handle 3 and the rear brace 2 and above the engaging end 41 of the first joint 4. The groove 51 is open to the engaging end 41 for receiving it, as depicted in FIG. 3. The second joint 5 will not touch the corresponding first joint 4 in folding or unfolding of the baby stroller. When the baby stroller is completely unfolded, the engaging end 41 is engaged in the groove 51, so that the first joint 4 and the corresponding second joint 5 can be connected in series, preventing the defect shown in FIG. 8B between the braces and the joints. When a baby sits on the baby stroller, stresses exerted on the handles 3 and the front braces 1 will not be concentrated on the first joints 4, but are transferred to the second joints 5 by engagement of the grooves 51 and the engaging ends 41, and then distributed in the whole structure of the stroller through the handles 3 and the rear braces 2 connected by the second joint 5. Thereby, deformation of all the braces, damage or stripping off of the rivets due to declination, and damage or deviation from the horizontal position of the rollers at the bottom ends of the braces by virtue of such declination (which will make the rollers hard for rolling as well as switching of direction) will not occur. The existing problems in a baby stroller can be resolved.

Figure 4:
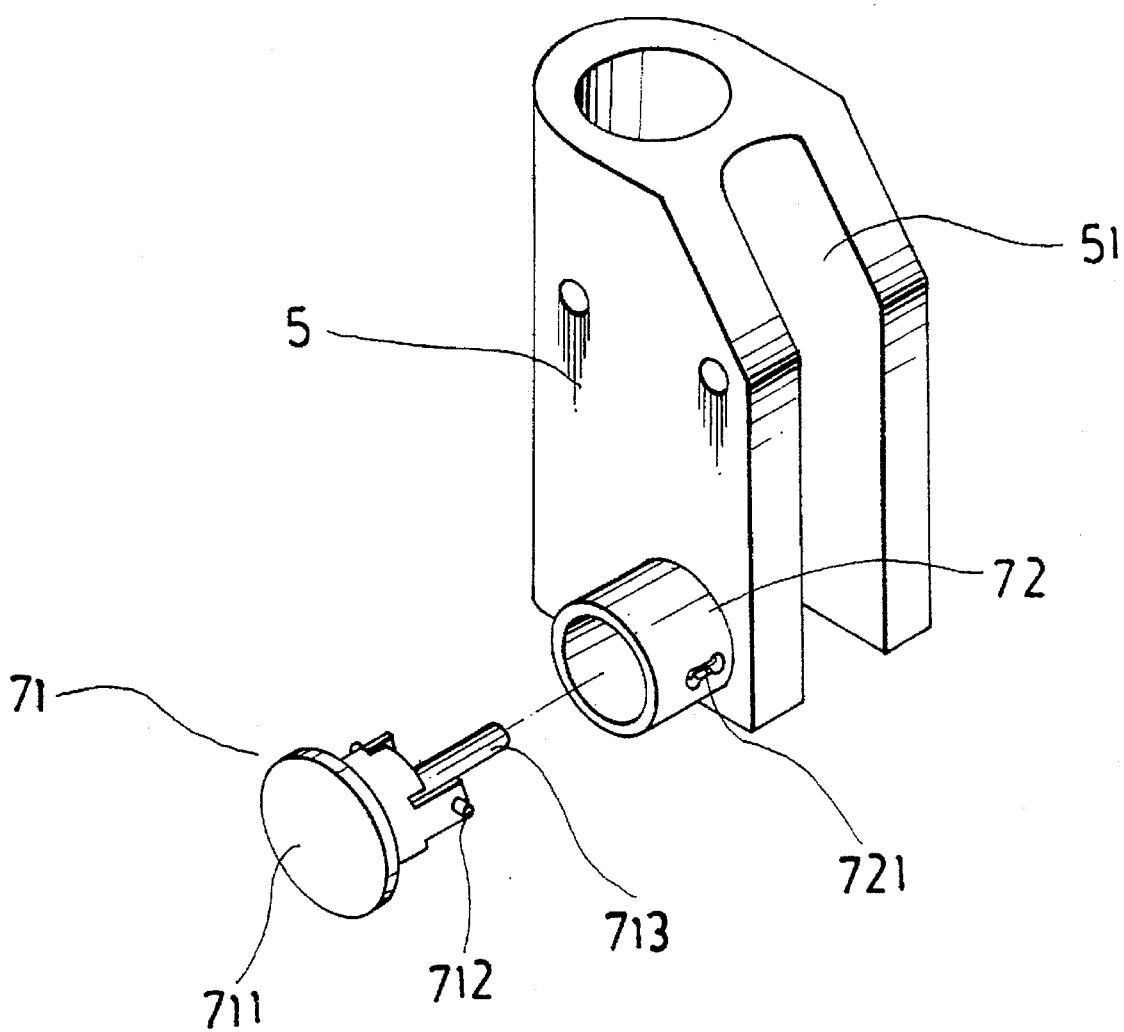
FIG. 4 is a partial exploded perspective view of the present invention.
Figure 5A:
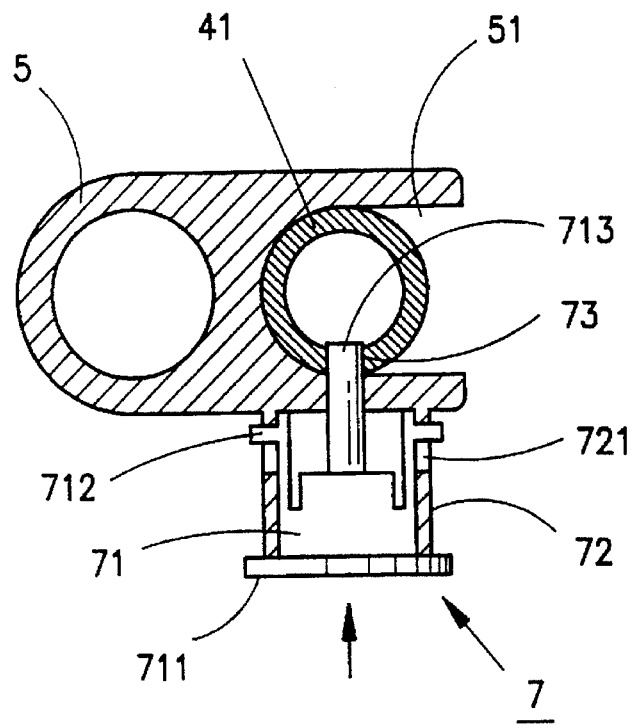
FIG. 5A is a sectional view of the present invention when it is not locked.
Figure 5B:
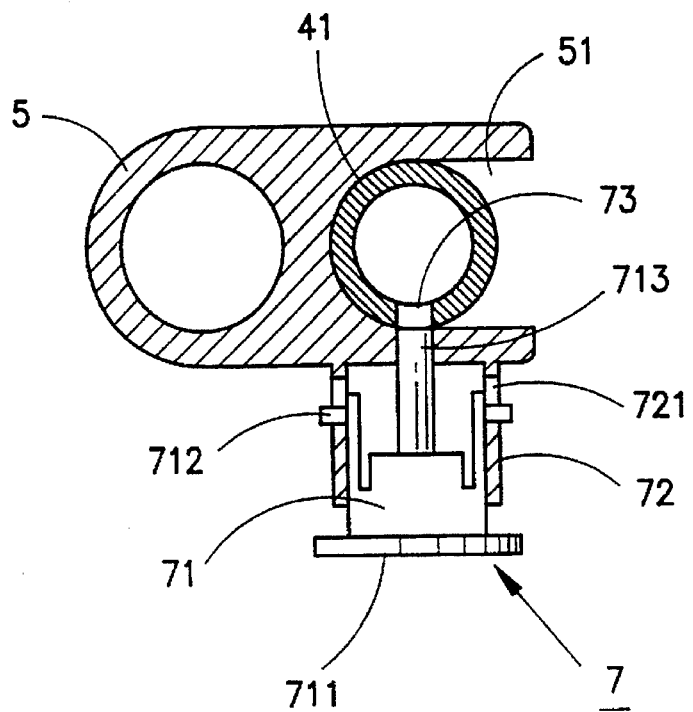
FIG. 5B is a sectional view of the present invention when it is locked.
Figure 6:
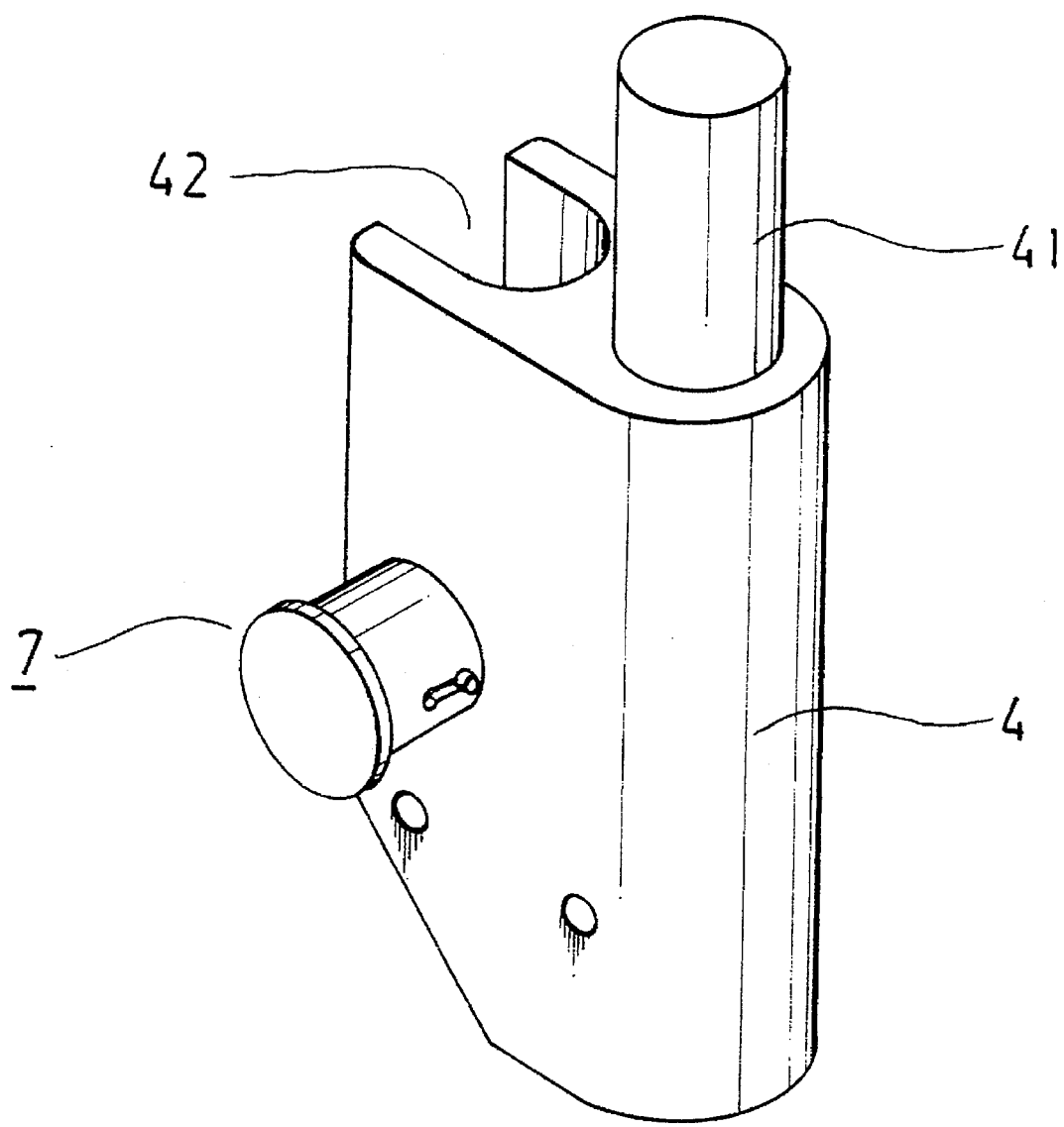
FIG. 6 is a perspective view of the present invention showing another embodiment.
Figure 7:
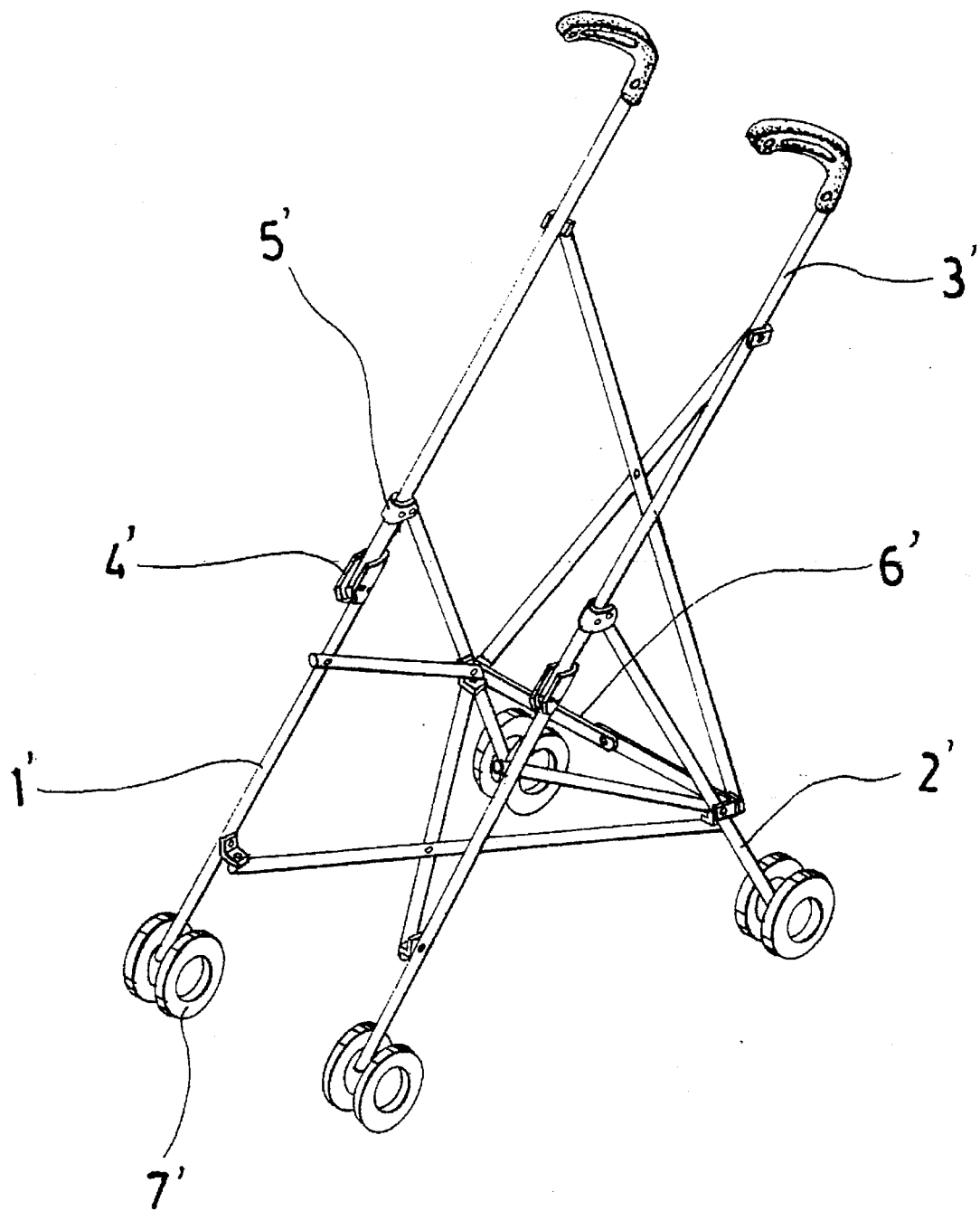
FIG. 7 is a perspective view of the prior art.
Figure 8A:
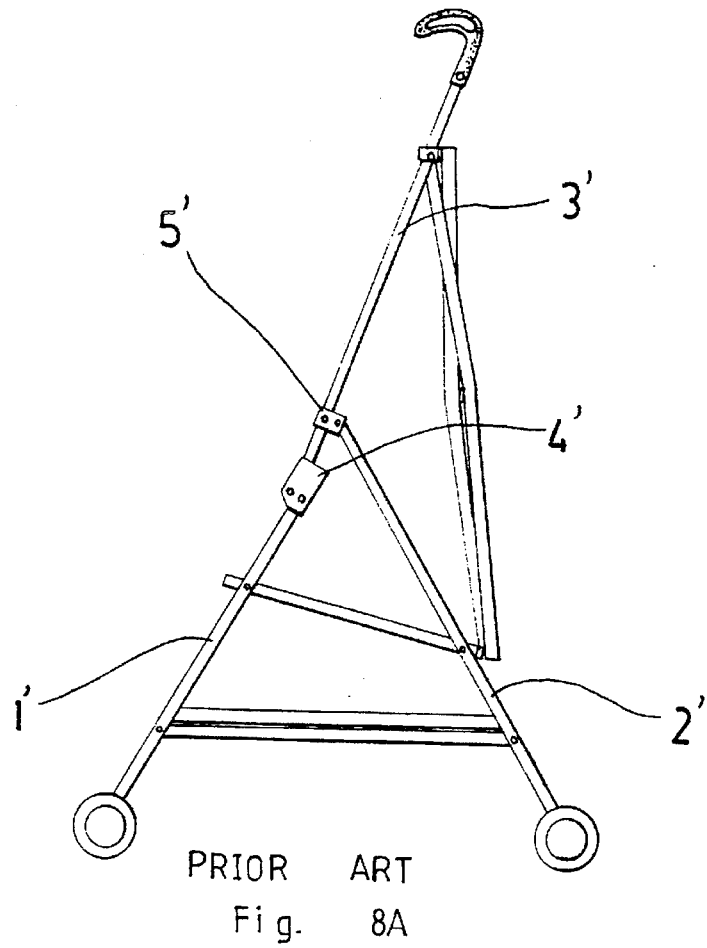
FIG. 8A is a side view of the prior art.
Figure 8B:
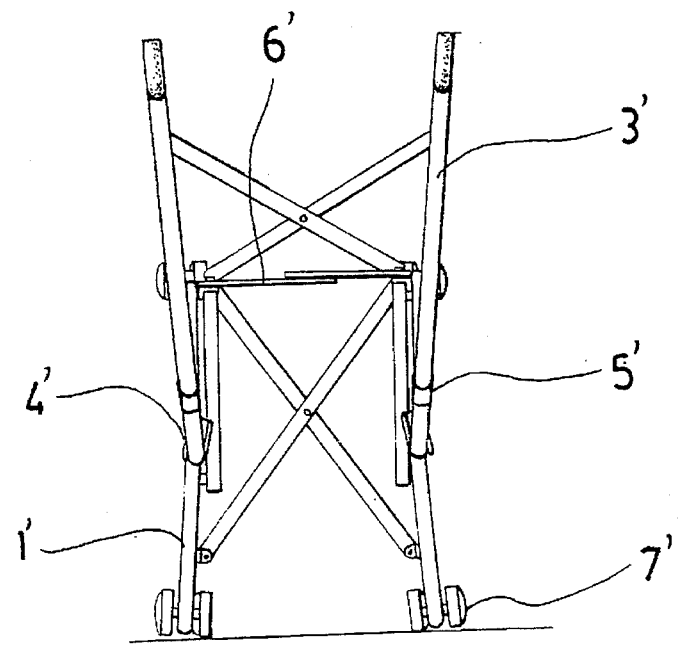
FIG. 8B is a view of the prior art showing the case when the baby stroller bears a load.

When practicing the present invention, there is an additional reinforcing structure, particularly, a locking device 7 provided on one side of each second joint 5 at the engaging portion of the groove 51 in the second joint 5 with the engaging end 41. The locking device 7 is formed of a pressing member 71 which is separated from the second joint 5 and a fixing member 72 which is integrally formed with the second joint 5 (referring to FIG. 4). The pressing member 71 has a push button 711 on one end thereof, latches 712 on both sides thereof, and an inserting rod 713 at the center position extending from the other end thereof. The fixing member 72 is in the form of a cylinder for receiving the pressing member 71 with the push button 711 left outside. Slots 721 each with a central portion thereof being narrower but with both ends thereof being broader are provided on both sides thereof. When the pressing member 71 is inserted in the fixing member 72 (as shown in FIG. 5A and FIG. 5B), the latches 712 can be engaged in the slots 721 respectively and each is in one broader portion of its corresponding slot 721. Thereby the pressing member 71 can have two stages of positioning in the slots 721. When the latches 712 are close to the base of the fixing member 72, the inserting rod 713 extends in the groove 51. With the aid of a positioning hole 73 provided on the engaging end 41 for insertion of the pressing member, each handle 3 and its corresponding front brace 1 can be locked together in this simple way. When it is desired to unlock, one only needs to draw up the push button 711 to cause the latches 712 to slide to the other end of the slots 721. Now referring to FIG. 3, the effect of the additional reinforcing structure (the locking device 7) is specified, when in folding of the baby stroller, the front and rear braces 1, 2 as well as the handles 3 are pivoted, moved relative to one another in taking the first joints 4 and the second joints 5 as their axes of rotation, if the front braces 1 and the handles 3 are in engagement, the baby stroller cannot be folded. There is provided a lockable holding device 8 (also referring to FIG. 1) to prevent the baby stroller from being unduly folded when a baby sits therein. However, the lockable holding device 8 can also possibly be damaged. In this case, when the baby stroller is struck by an external force or there is an undue folding of the baby stroller by virtue of inadvertent unlocking of the lockable holding device 8, the locking device 7 can function to keep the baby stroller in an unfolded state. When the baby stroller is loaded, stress on the connection portion of the handles 3 and the front braces 1 produced by folding can be largely borne by the additional reinforcing structure. In this way, the baby stroller will have in no case the situation as shown in FIG. 8A which can damage the baby stroller. The above mentioned locking device 7 can also be provided on the first joints 4 (such as shown in FIG. 6) and outside of a groove 42 allowing the handles 3 to pivot (not shown here). Each handle is provided with a positioning hole, so that the handles 3 and the front braces 1 can be engaged with each other. This can make the first joints 4 and the second joints 5 firmer in addition to establishing an additional reinforcing function.

My invention may assume numerous forms and is to be construed as including all modifications and variations falling within the scope of the appended claims.

I claim:

1. A reinforced structure for joints of braces of a baby stroller, the baby stroller having two side structures each having a front brace, a handle and a rear brace, the reinforced structure comprising:

a) a first joint member fixedly connected to the front brace such that the front brace passes through the first joint member so as to form an engaging end extending from the first joint member, the first joint member also pivotally attached to the handle;

b) a second joint member immovably connected to the handle and pivotally connected to the rear brace, the second joint member having a rear side generally parallel to the handle;

c) a groove in the rear side of the second joint member configured to receive the engaging end extending from the first joint member when the front brace is oriented substantially parallel to the handle; and, d) a locking device for releasably locking the second joint member and the engaging end together, the locking device comprising:

i) a locking hole in the engaging end;

ii) a hollow generally cylindrical fixing member extending outwardly from the second joint member, the fixing member having a sidewall with at least one slot having opposite, enlarged ends; and, iii) a pressing member slidably received in the fixing member and having an inserting rod and at least one latching pin engaging the at least one slot such that, when the at least one latching pin engages one of the enlarged ends, the inserting rod engages the locking hole in the engaging end to prevent relative pivoting movement between the handle and the front brace and, when the latching pin engages the opposite enlarged end, the inserting rod is out of engagement with the locking hole, thereby enabling relative pivoting movement between the handle and the front brace for folding of the baby stroller.

\* \* \* \* \*